US012755608B2

(12) United States Patent
Dhaliwal et al.

(10) Patent No.: US 12,755,608 B2
(45) Date of Patent: Oct. 6, 2026

(54) AUGMENTED REALITY REWARD GAME

(71) Applicant: Aristocrat Technologies, Inc., Las Vegas, NV (US)

(72) Inventors: Upinder Dhaliwal, Las Vegas, NV (US); Eric Droukas, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 257 days.

(21) Appl. No.: 18/364,986

(22) Filed: Aug. 3, 2023

(65) Prior Publication Data

US 2024/0054862 A1 Feb. 15, 2024

Related U.S. Application Data

(60) Provisional application No. 63/398,043, filed on Aug. 15, 2022.

(51) Int. Cl.
*G07F 17/32* (2006.01)
*G06T 19/00* (2011.01)

(52) U.S. Cl.
CPC ........ *G07F 17/3267* (2013.01); *G06T 19/003* (2013.01); *G06T 19/006* (2013.01); *G07F 17/3239* (2013.01)

(58) Field of Classification Search
None
See application file for complete search history.

(56) References Cited

U.S. PATENT DOCUMENTS

| | | | | |
|---|---|---|---|---|
| 10,204,476 | B2 * | 2/2019 | Arumugam | G07F 17/3244 |
| 10,217,284 | B2 * | 2/2019 | Das | G06T 19/006 |
| 11,410,487 | B2 * | 8/2022 | Ciardi | G07F 17/3244 |
| 12,198,263 | B2 * | 1/2025 | Dhaliwal | G06T 19/20 |
| 2015/0043784 | A1 * | 2/2015 | Flint | G01C 21/206<br>382/106 |
| 2015/0091941 | A1 * | 4/2015 | Das | A63F 13/88<br>345/633 |
| 2016/0284125 | A1 * | 9/2016 | Bostick | G06T 19/006 |
| 2017/0256124 | A1 * | 9/2017 | Arumugam | G07F 17/3211 |
| 2019/0051101 | A1 * | 2/2019 | Russ | G07F 17/3211 |
| 2019/0088086 | A1 * | 3/2019 | Rajendran | H04W 4/025 |
| 2020/0067998 | A1 * | 2/2020 | Pilnock | A63F 13/77 |
| 2020/0349800 | A1 * | 11/2020 | Ciardi | G06Q 30/0209 |
| 2021/0046383 | A1 * | 2/2021 | Dhaliwal | A63F 13/537 |
| 2023/0281915 | A1 * | 9/2023 | Dhaliwal | G06T 15/205<br>345/419 |

* cited by examiner

*Primary Examiner* — Seng H Lim
(74) *Attorney, Agent, or Firm* — Blank Rome LLP

(57) ABSTRACT

A navigation technique includes capturing a scan of a local physical environment comprising a physical gaming area, determine the location of a local device within the physical gaming area based on the captured scan, and identifying a game path based on the determined location of the local device, wherein the game path comprises one or more regions of interest within the physical gaming area. A graphical navigation overlay is presented on the local device, and includes navigational information for the game path. The location of the local device is tracked using sensor data captured by the local device. When the local device has reached a first region of interest of the one or more regions of interest within the physical gaming area, a mini-game overlay is presented on the local device.

20 Claims, 19 Drawing Sheets

500

AUGMENTED REALITY REWARD GAME

CROSS REFERENCE TO RELATED APPLICATIONS

This patent application claims the benefit of U.S. Provisional Patent Application No. 63/398,043, filed on Aug. 15, 2022, the disclosure of which is hereby incorporated by reference.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

DETAILED DESCRIPTION

Figure 1:
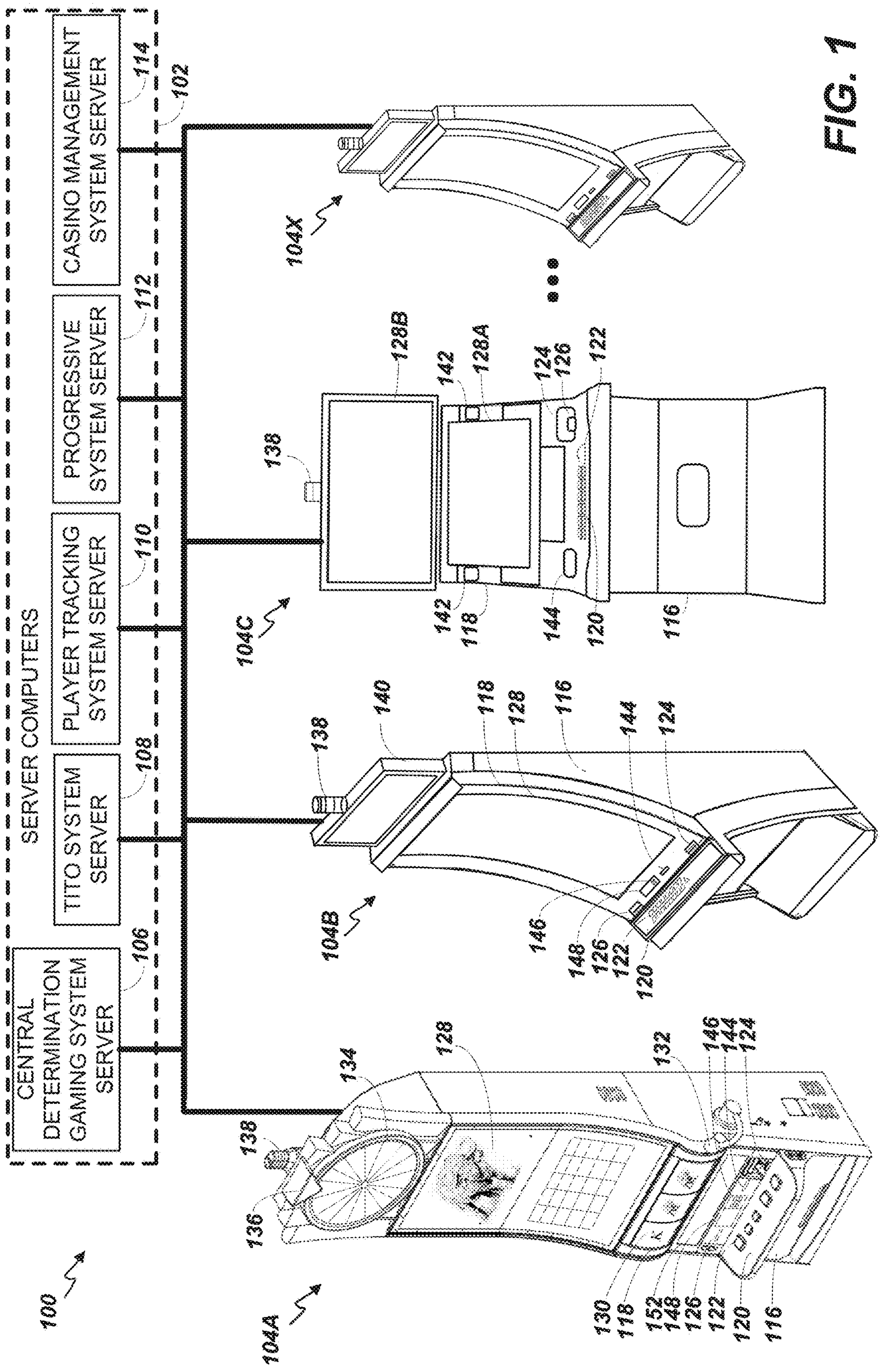
FIG. 1 is an exemplary diagram showing several EGMs networked with various gaming related servers.

Embodiments herein described in augmented reality game system that determines a player location within a physical gaming environment, determines a game paths comprising a set of regions of interest, and graphically assists the user in navigating through the game pass such that the user reaches each of the regions of interest. In some embodiments, these regions of interest may be associated with mini-games in the augmented reality reward game such that a user is prompted to complete a game once each region of interest is reached.

According to one or more embodiments, the augmented reality reward game enhances gameplay at electronic game machines by providing additional content that may be related to the electronic gaming machines. For example, in some embodiments one or more of the many games may be related to one or more physical electronic gaming machines located along the game path. In a similar manner, the functionality of the electronic games on the electronic gaming machines may be enhanced by the extended resources of the mobile device. As such, the functionality of the electronic gaming machines are improved by utilizing hardware and other resources available on a mobile device. Further, embodiments described herein enhance navigation technology by providing augmented reality elements to make clear on the user interface a path for the user to follow, as well as providing interactive components in the form of many games along the path which indicates to a user that a region of interest along the path has been reached.

Today's casino properties include rewards systems that attempt to deliver experiences that a player will value and generate loyalty. By doing so, casinos attempt to incentivize a player to continue his/her gaming activity at a specific casino or casino brand. However, the reward offering from a traditional reward program typically are not personal or provide players experiences that may not be replicated or found at other casinos. Traditional reward programs also do not provide immersive experiences. Generally, traditional reward programs fail to make an emotional/fun connection between players and the casino brand. Embodiments described herein provide an augmented reality experience according to the location of a player (or player's device) within a physical gaming area, such as a casino.

To provide for an AR way finding experience, the AR reward gaming system communicates and/or integrates with a casino reward system using a player ID and/or player name. The AR reward gaming system does not need to store any other types of player information and can link a player's account with a unique identifier. The AR reward gaming system can store, utilize, and/or generate other non-player information, such as pre-determined reward value and/or generate a barcode/QR code to redeem the player reward. Although the reward can be of monetary value, other forms of reward, such as experience-based rewards, non-fungible tokens (NFTs), etc. could be rewarded.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system (CMS) 114, which may include one or more servers. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
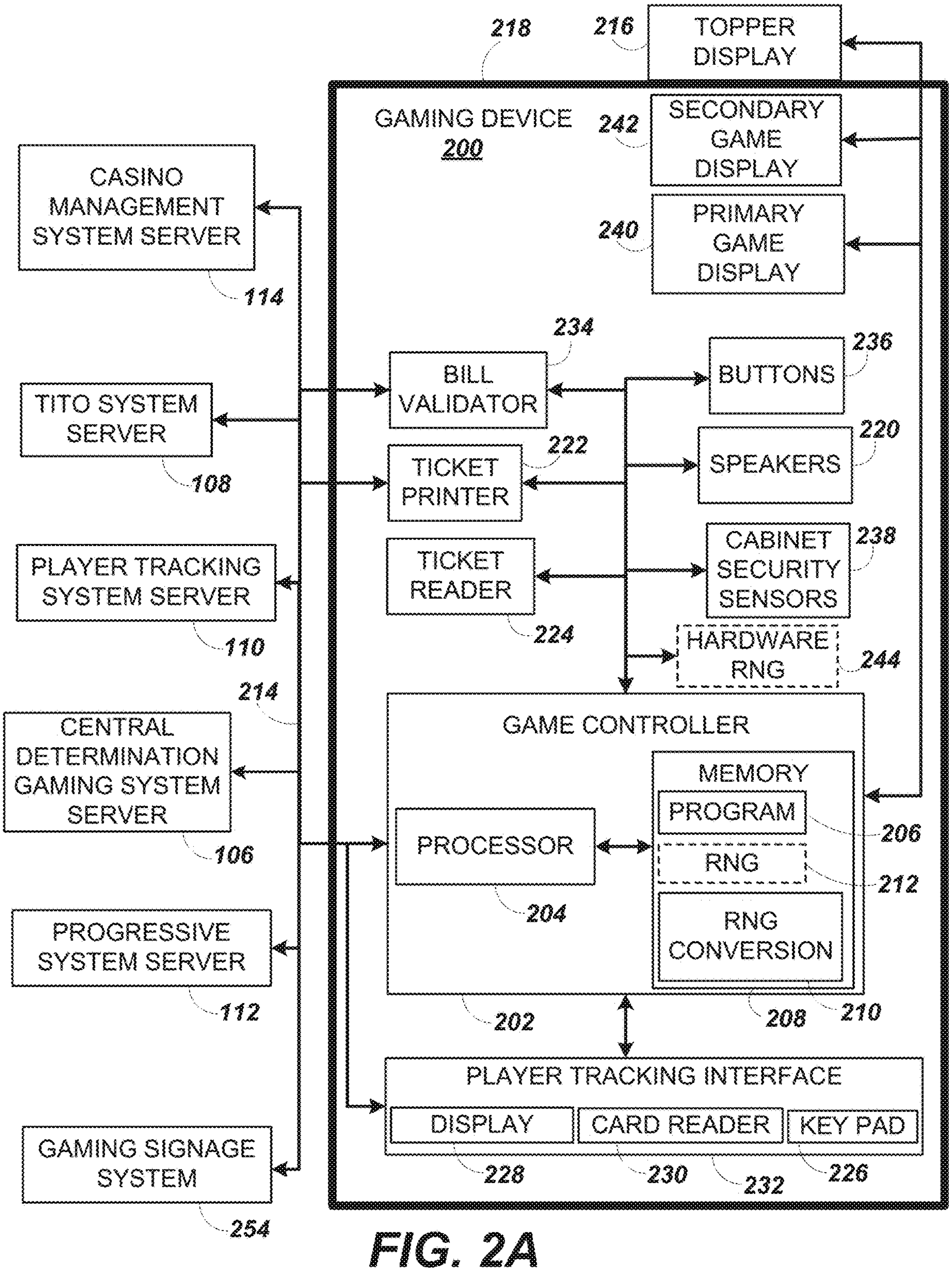
FIG. 2A is a block diagram showing various functional elements of an exemplary EGM.

Many or all of the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system (CMS).

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
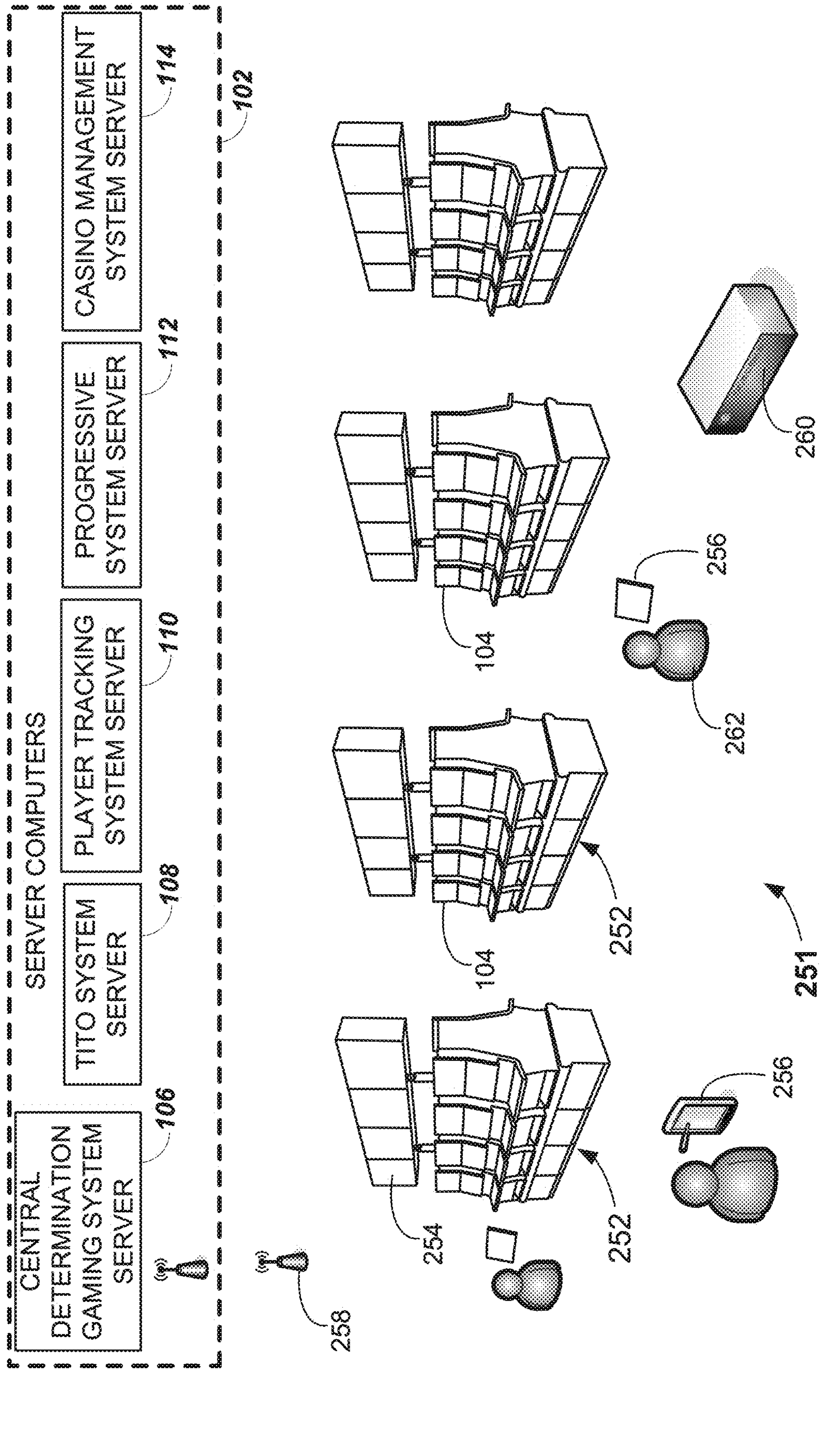
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
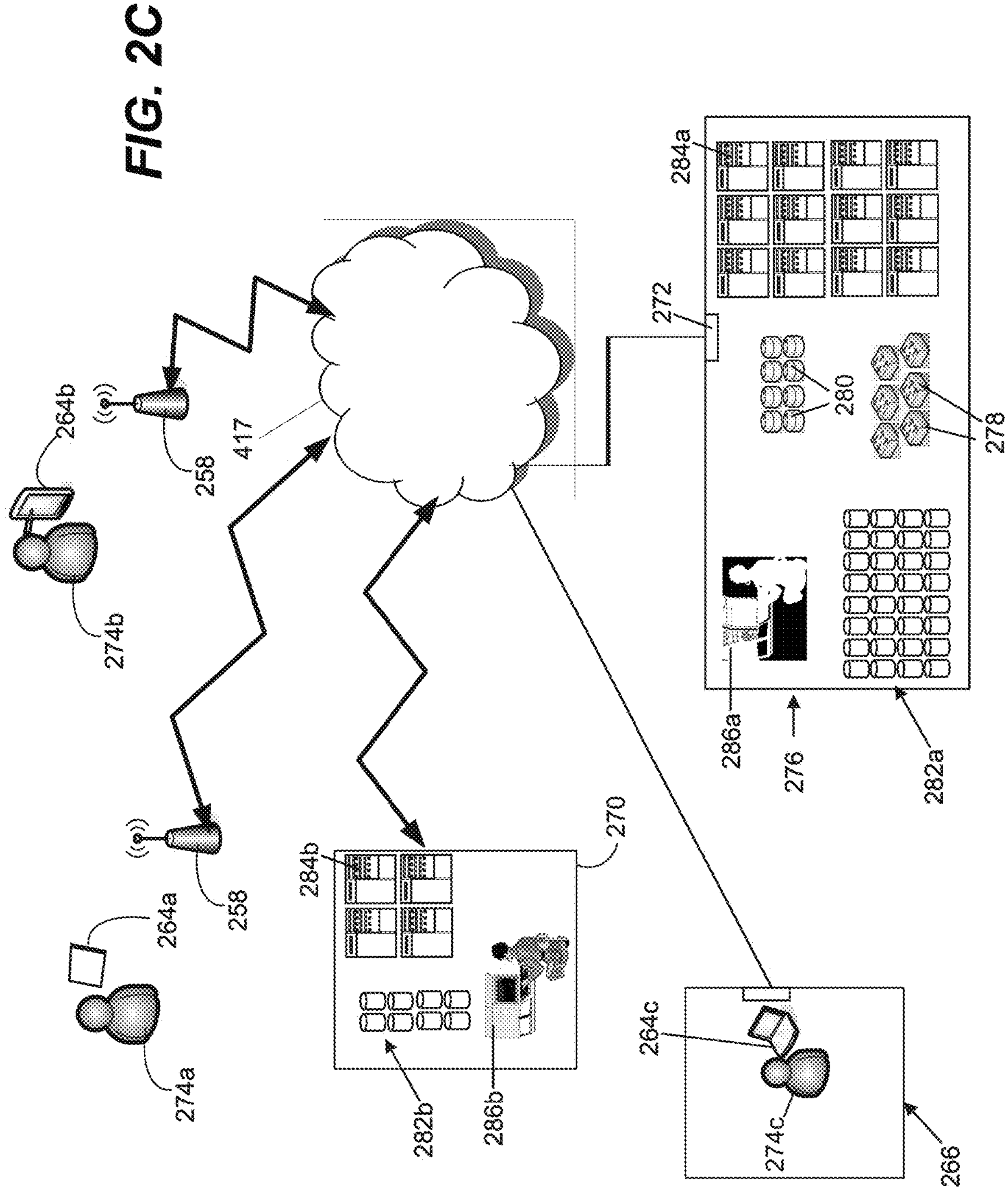
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser.

Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
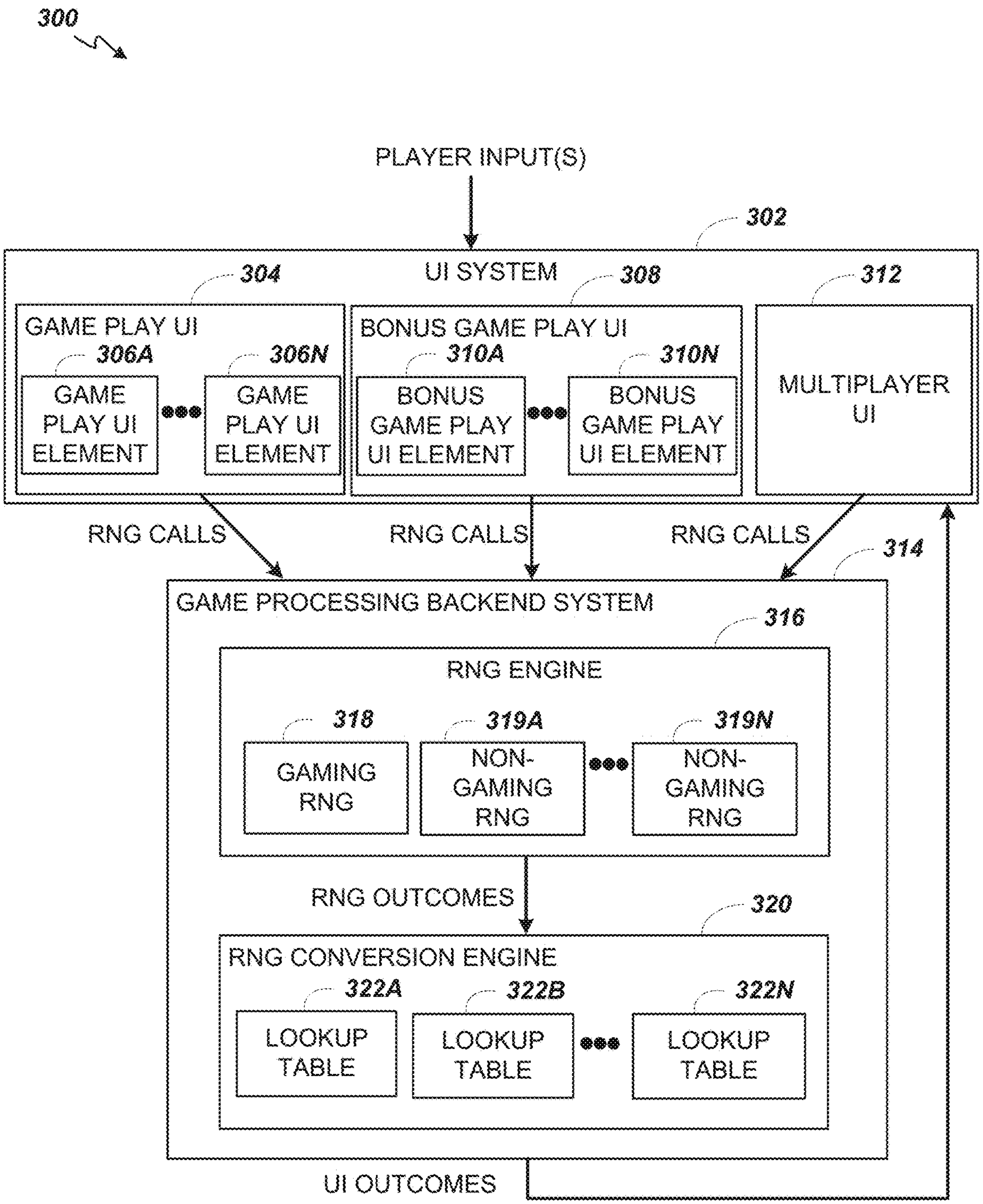
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
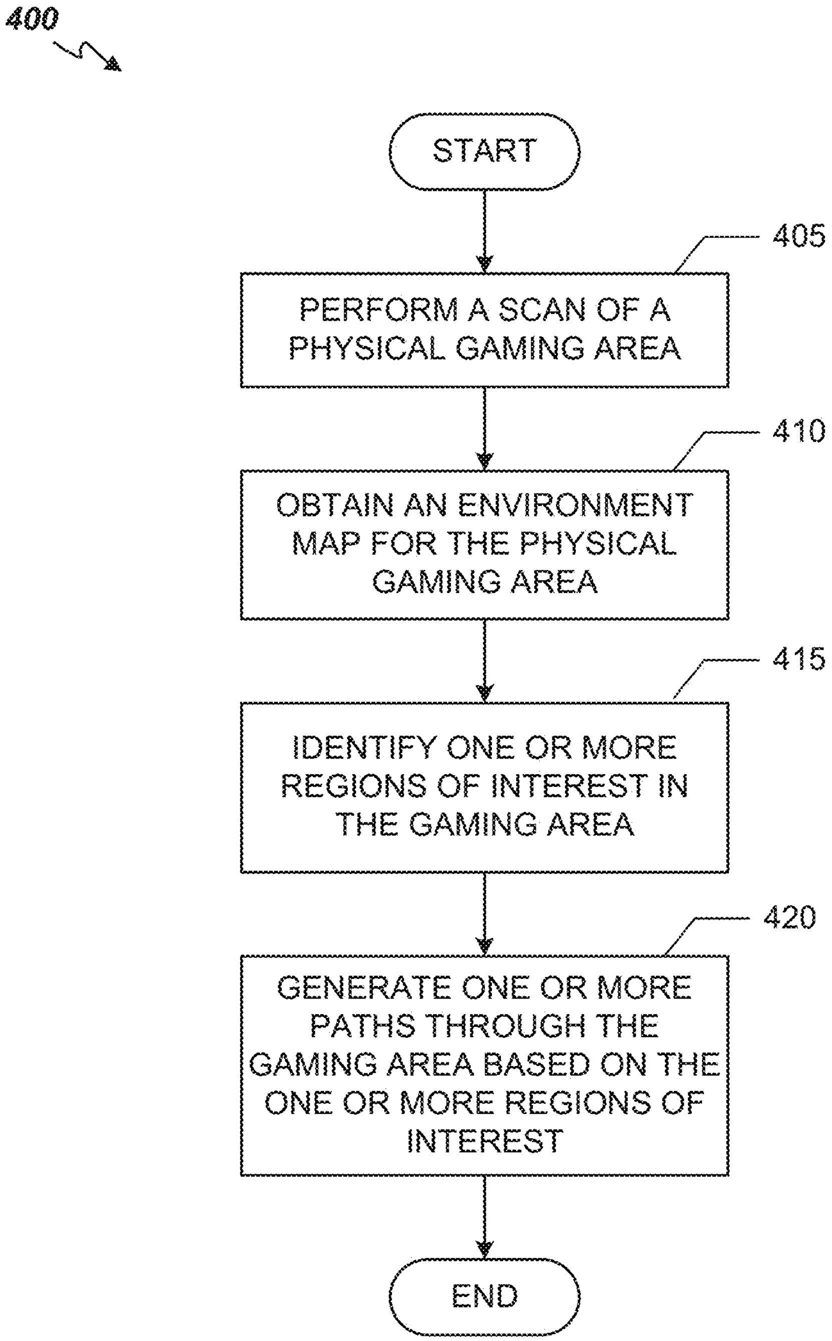
FIG. 4 illustrates a flow diagram of a technique for generating a set of paths, in accordance with one or more embodiments.

FIG. 4 illustrates a flow diagram of a technique for generating a set of paths, in accordance with one or more embodiments. Although the flow diagram depicts various actions and processes performed in a particular order, it should be understood that in some embodiments, the actions and processes may be performed in a different order. Further, in some embodiments, some or all of the actions may be performed concurrently. In addition, in some embodiments not all processes or actions may be necessary to complete the tasks described, or additional processes or actions may be needed. In addition, the various steps are described as being performed by particular components, for example among a client device, a CMS, and an augmented reality (AR) system. However, the components performing the steps may differ in accordance with some embodiments.

The flowchart 400 begins at block 405 where a system performs a scan the floor of the gaming area. A scan can be performed by capturing sensor data of the physical gaming area, such as image data, depth data, and the like. For example, cameras, depth sensors, and/or the like can be used to capture sensor data from which characteristics of the physical gaming area can be derived. These characteristics may include, for example, geometric information, texture information, and the like. Further, in some embodiments, the characteristics may include detected objects or classifications of objects in the environment. In some embodiments, an electronic device having or operative connected to a camera and/or depth sensors or other sensors may capture the sensor data within a gaming area. For example, a mobile device may navigate through the environment to capture sensor data from various locations and/or viewpoints. Alternatively, sensor data may be collected from cameras and/or other sensors located within the physical environment.

The flowchart continues at block 410, where an environment map is obtained for the physical gaming area. In some embodiments, the environment map may be generated by a client device, such as a mobile device configured to capture the environment. Alternatively, the sensor data and/or other information related to the physical game environment may be transmitted to or otherwise obtained by an AR system. The environment map may be generated, for example by stitching together geometric and/or texture information captured from different locations and/or different points of view within the gaming area.

The environment map may include, for example, a 3D representation of the physical gaming areas from which paths throughout the gaming area can be identified. The environment map may be represented in the form of a 3D mesh, point cloud, 2D representation of a floor of the physical gaming area, or other representation of the geometric and/or visual characteristics of the physical environment. In some embodiments, the environment map may be generated by "stitching together" image data and other sensor data to form a continuous representation of the environment. As such, the scale and dimensions of the components captured in the environment may be warped to a particular scale such that the environment map is generated in a uniform scale.

In some embodiments, the environment map may be updated at a later time. For example, the environment map may be updated when additional or more current sensor data is available or is collected of the physical environment. This may occur, for example, when a user captures additional sensor data in the environment, when additional sensor data is captured by one or more cameras or other sensors mounted within the environment, or the like.

The flowchart continues at block 415, where the system identifies one or more regions of interest in the gaming area. The regions of interest may be identified, for example, by a local client device capturing the image and/or other sensor data, by a remote device such as an AR system or server, or the like. In some embodiments, the regions of interest may be provided by user input or the like. The one or more regions of interest may be associated with region of interest parameters, such as particular electronic gaming devices or classifications of gaming devices, refreshment areas, low traffic areas, high-traffic areas, other entertainment areas, and the like. The regions of interest may be identified, for example, using object recognition in image data captured by one or more cameras. For example, an image of a casino floor may have identifiable components, such as a food and beverage stand, an electronic gaming machine, a stage, and/or the like. According to one or more embodiments, the regions of interest may be identified based on a recognized object, or may be further classified based on a detected object or region type.

The flowchart concludes at block 420, where one or more paths are generated through the gaming area based on the one or more regions of interest. The paths may be generated, for example, by a local client device capturing the image and/or other sensor data, by a remote device such as an AR system or server, or the like. In some embodiments, the paths may be provided by user input or the like. According to some embodiments, the one or more paths may include or be adjacent to at least a subset of the identified regions of interest. The paths may be determined based on characteristics of the environment, such as traffic patterns, user preference, length of path, characteristics of the physical gaming area along the path, and the like. According to some embodiments, a path is generated by defining a region of the gaming area traversable by a user which satisfy one or more path criteria and which satisfy the minimum number of regions of interest. The paths may be regions of floor surface traversable by a user. For example, paths may be identified based on criteria such as minimum width, destination parameters, intermediate location parameters, and the like. Accordingly, the paths may be defined in terms of a surface region which is unobstructed and/or which satisfies path criteria.

Figure 5:
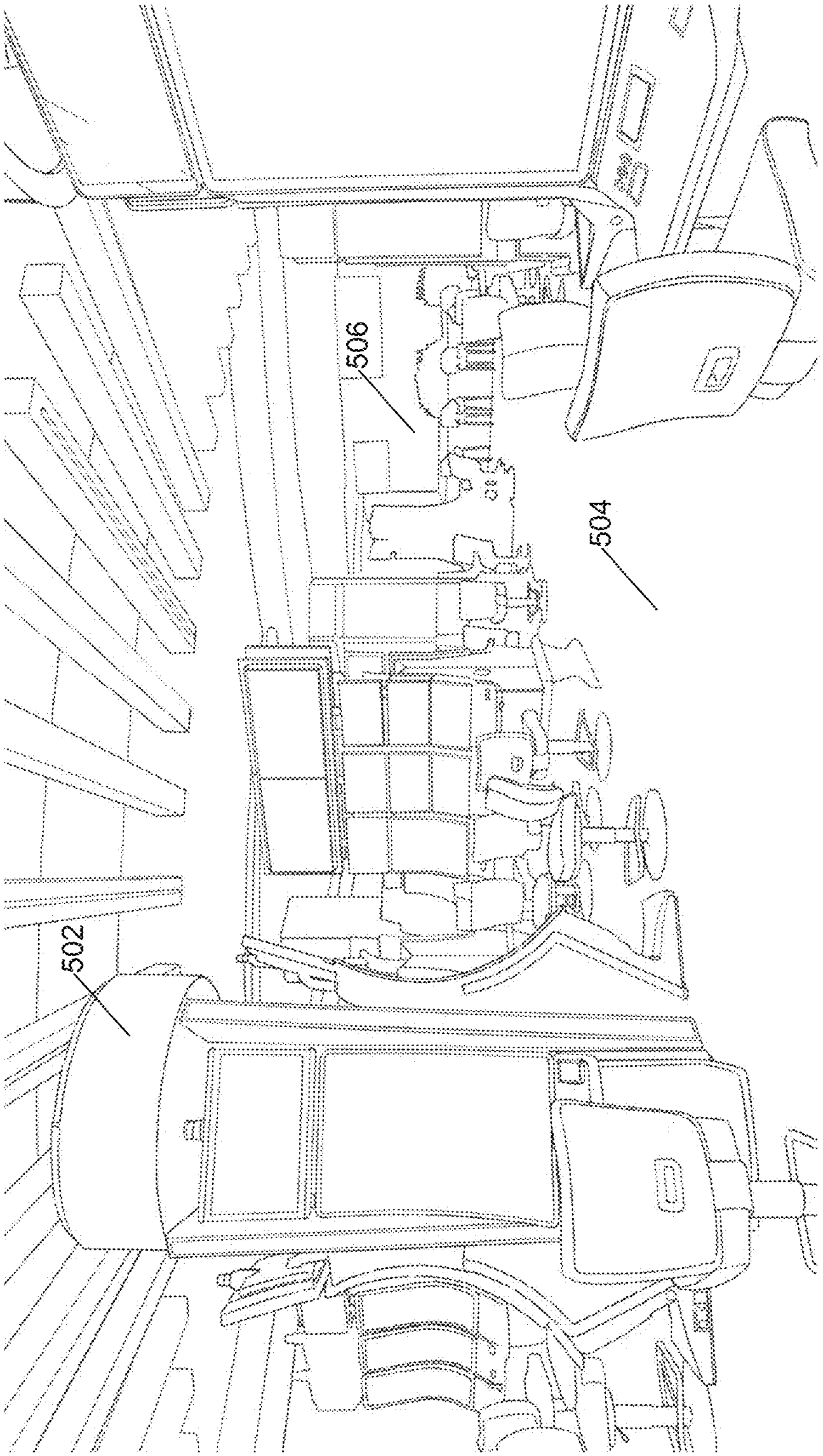
FIG. 5 depicts an example 3D mesh as a physical gaming area, in accordance with one or more embodiments.

FIG. 5 depicts an example representation of a physical gaming area, in accordance with one or more embodiments. As described above, in some embodiments the scan of the physical gaming area may be used to generate a 3D representation of the physical gaming area from which paths may be determined. As such, FIG. 5 depicts an example 3D representation 500 of a physical gaming area. In some embodiments, the physical gaming area representation may be obtained from or generated from sensor data of the environment from multiple viewpoints, as described above. That sensor data may be stitched together to form the representation of the physical gaming area. For example, sensor data from two viewpoints can be used to generate a single representation by matching features from the sensor data captured at the two viewpoints, performing an interpolation or extraction of the captured sensor data, performing warping or other techniques to resolve differences from the viewing angles, or the like As such, from the representation of the physical gaming area, various regions of interest and other components may be identified. For example, electronic gaming devices such as gaming device able to be used as regions of interest becomes apparent. Further, non-gaming areas can also be identified, such as concession area 506. Paths may be identified, for example, based on the detected surface in the physical gaming area is associated with a floor 504.

Figure 6:
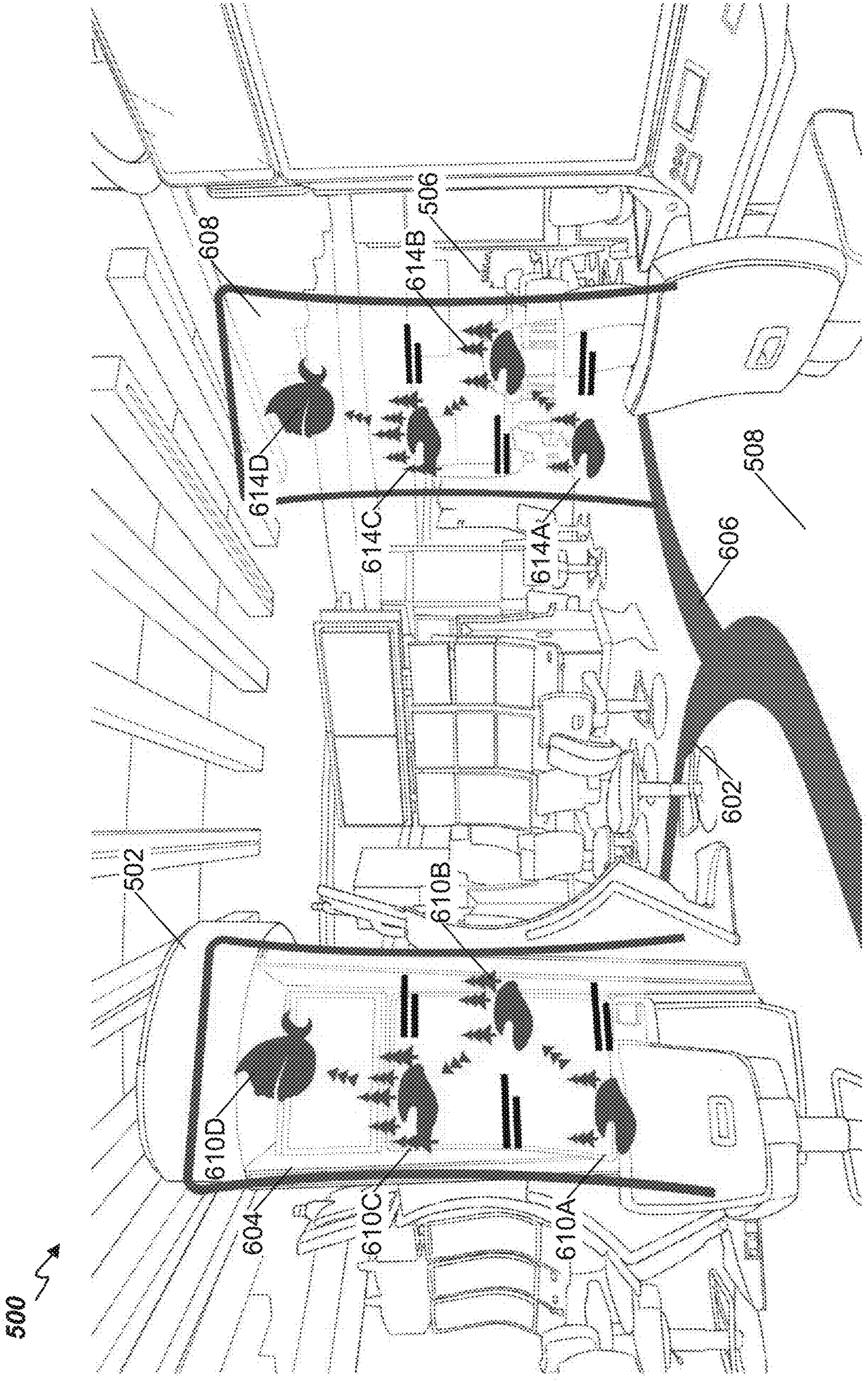
FIG. 6 depicts an example set of game paths within the 3D mesh, in accordance with one or more embodiments.

FIG. 6 depicts an example set of game paths within the representation of the physical gaming area, in accordance with one or more embodiments. In particular, FIG. 6 depicts the 3D representation of the physical gaming environment as shown above with respect to FIG. 5, with an example overlay for a set of game paths. In particular, two game path options are shown at 604 (having a region of interest corresponding to EGM 502), and at 608 (having a region of interest corresponding to concession area 506). As shown, the first game path 602 corresponds to a set of minigames and corresponding path depicted at 604. These minigames include minigame 610A, 610B, 610C, and 610D. The minigames are reached along the first potential game path 602, as a user traverses the path to pass or become proximate to regions of interest, such as the EGM 502. Similarly, the second game path 606 corresponds to a set of minigame and corresponding path depicted at 608. These minigames include minigame 614A, 614B, 614C, and 614D. The mini games are reached along the second potential game path 606, as a user navigates near regions of interest, such as concession area 506.

Figure 7:
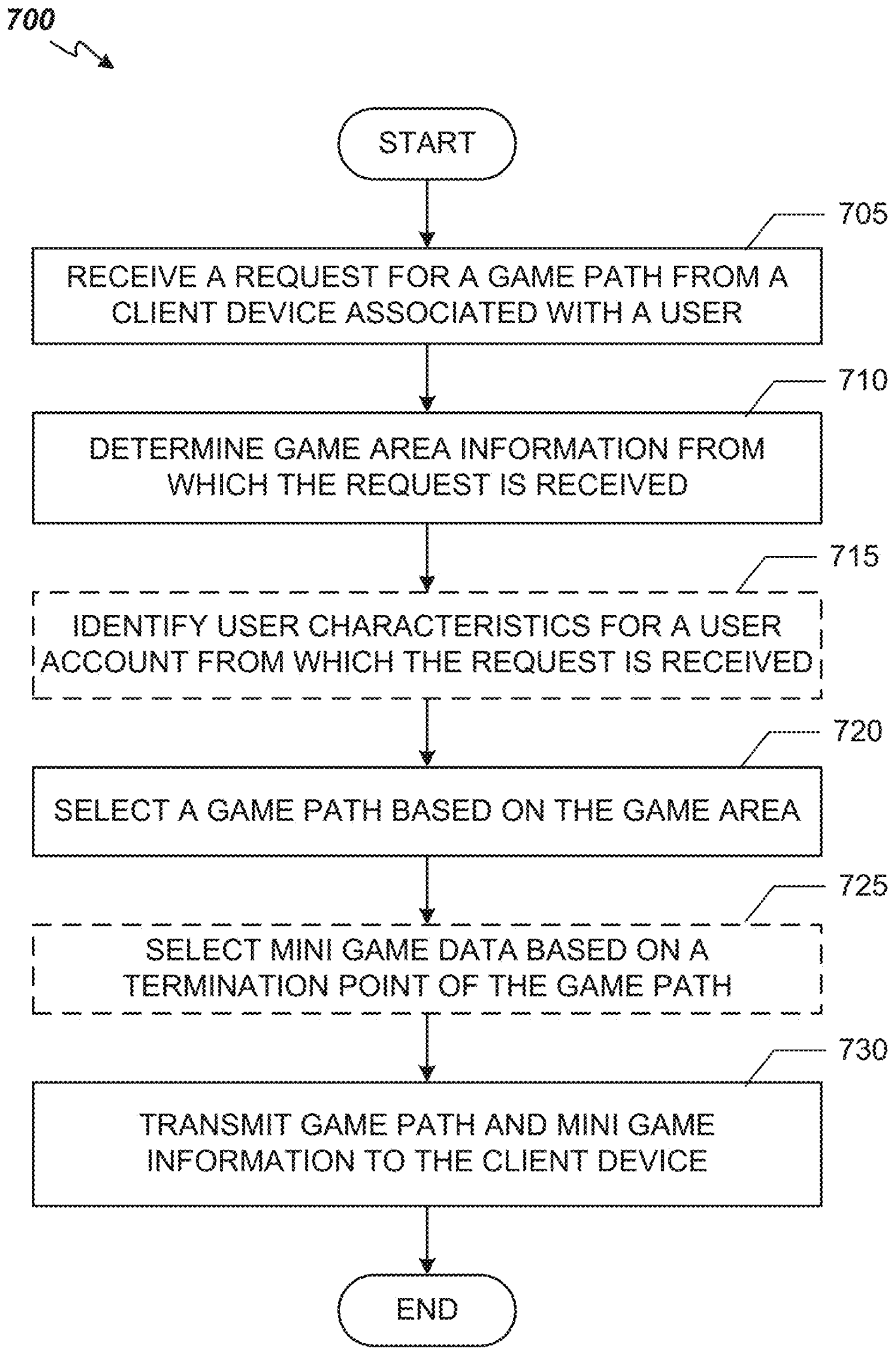
FIG. 7 illustrates a flow diagram of a technique for providing navigational and gaming data for a client device, and according to the more embodiments.

FIG. 7 illustrates a flow diagram of a technique for providing navigational and gaming data for a client device, and according to the more embodiments. Although the flow diagram depicts various actions and processes performed in a particular order, it should be understood that in some embodiments, the actions and processes may be performed in a different order. Further, in some embodiments, some or all of the actions may be performed concurrently. In addition, in some embodiments not all processes or actions may be necessary to complete the tasks described, or additional processes or actions may be needed.

The flowchart 700 begins at block 705 where a request is received for game path from a client device associated with a user. For example, a user may be located in the physical gaming environment and initiate an application which provides the augmented reality game paths described above. The request may be received, for example, when a user launches an app on the local client device, navigates to a predetermined website on the local device, or the like. For example, in some embodiments, the physical gaming area may provide a digital code which may be read by the user to access the augmented reality game app. The digital code may be, for example, a QR code, web link, or the like. The request may include, for example, information about the physical location in which the user is located, specific location information within the gaming area, identifying user information, or the like.

The flowchart 700 continues to block 710, where the game area information is determined for a physical gaming area from which the request is received. For example, the client device may have requested augmented reality game path information for a specific location, specific one or more game paths, or the like. Additionally, or alternatively, a server device or other backend device hosting the augmented reality game path can determine from the request information data regarding physical gaming environment from which the request is received (e.g., where the requesting user is located).

Optionally, in one or more embodiments, the flowchart 700 continues to block 715, where user characteristics are determined from a user account from which the request is received. The user characteristics may be provided, for example, based on user input, based on the user identifier associated with the request received from the client device at block 705, or the like. According to some embodiments, the user characteristics may include, for example, history information for a user account from which the request is received. The historic information may include for example, whether a user has visited the physical gaming area before, whether the user has visited particular electronic gaming machines within the physical gaming area, or the like. User characteristics may also include, for example, user demographic information determined from the user account. In some embodiments, any identifying information for the user may be identified only in response to receiving user approval for collection of personal identifying data, or the like.

At block 720, a game path is selected for the physical gaming area. The game path may be selected for the requesting device, for example based on identifying user characteristics, characteristics of the physical gaming area or the like. In some embodiments, additional considerations may be determined, such as contextual information. This may include, for example, information regarding scheduled events at the physical gaming area, traffic patterns currently detected in the physical gaming area (or determined based on other users on the same or different game paths), or the like. Optionally, at block 725, minigame data is selected based on a termination point of game path. According to some embodiments, minigame is provided along the path may be related to physical electronic gaming devices along the game path, or at the end of the game path. For example, the minigame may be associated with a same gaming family as a physical electronic in device located at the region of interest at the conclusion of the select game path. In some embodiments, the system hosting be game paths in the games may have multiple types of minigames available, which may be selected based on a selected game path.

The flowchart 700 concludes at block 730, where the game path and minigame information is transmitted to the client device. According to some embodiments, the transmission may include providing, for download, game path and minigame information. Additionally, or alternatively, the game has and minigame information may provide lookup information for which the game happened minigame may be loaded, either locally on the client device (for example, if an associated application has previously been downloaded), or from a remote device accessible over a network.

Figure 8:
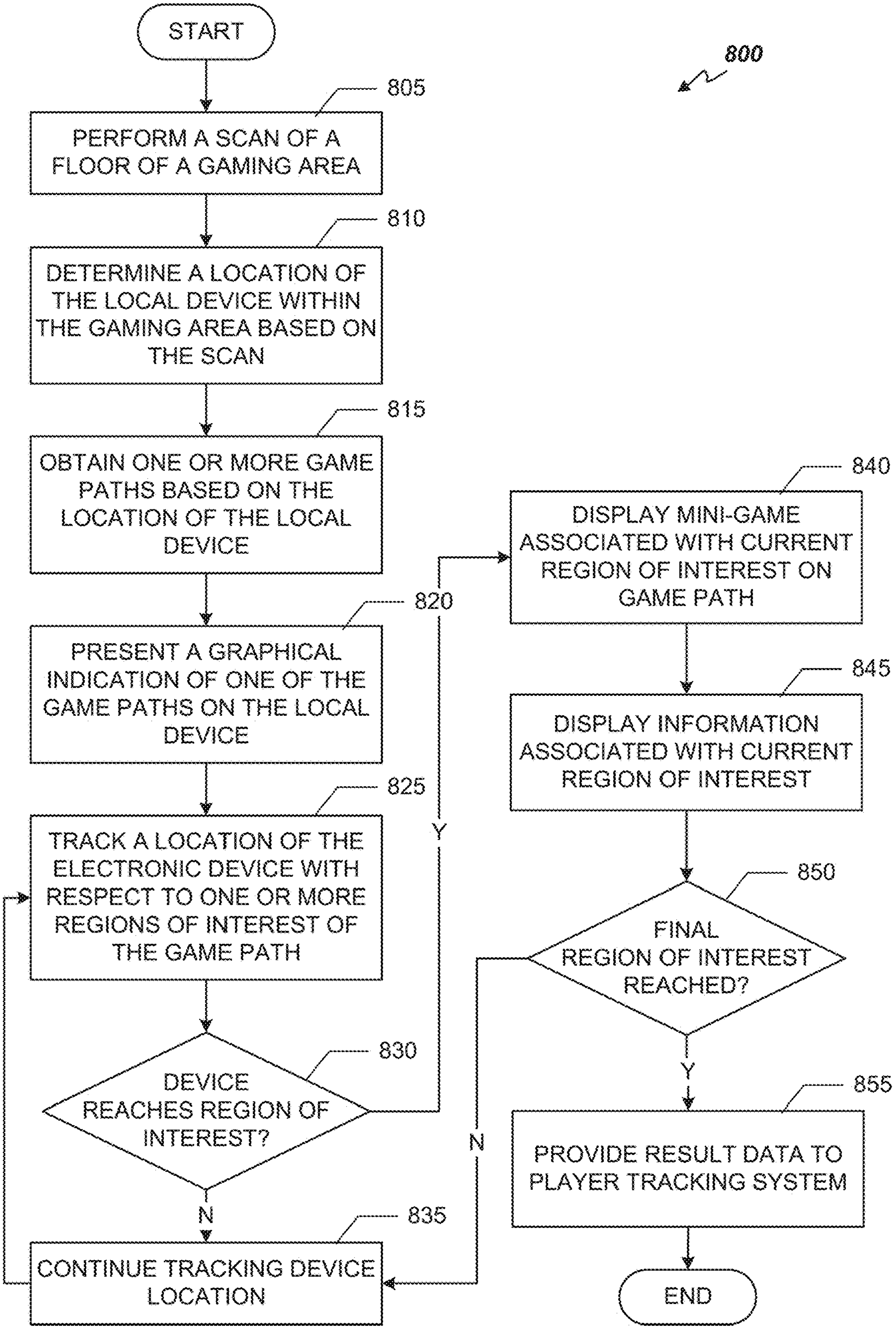
FIG. 8 illustrates a flow diagram of a technique for navigating client device through a game path in a physical gaming area, in accordance with one or more embodiments.

FIG. 8 illustrates a flowchart of a technique for navigating client device through a game path in a physical gaming area, in accordance with one or more embodiments. In particular, FIG. 8 depicts a flowchart from the point of view of the client device as a user of the client device is navigating through a physical gaming area while using the augmented reality game. Although the flow diagram depicts various actions and processes performed in a particular order, it should be understood that in some embodiments, the actions and processes may be performed in a different order. Further, in some embodiments, some or all of the actions may be performed concurrently. In addition, in some embodiments not all processes or actions may be necessary to complete the tasks described, or additional processes or actions may be needed.

Figure 9:
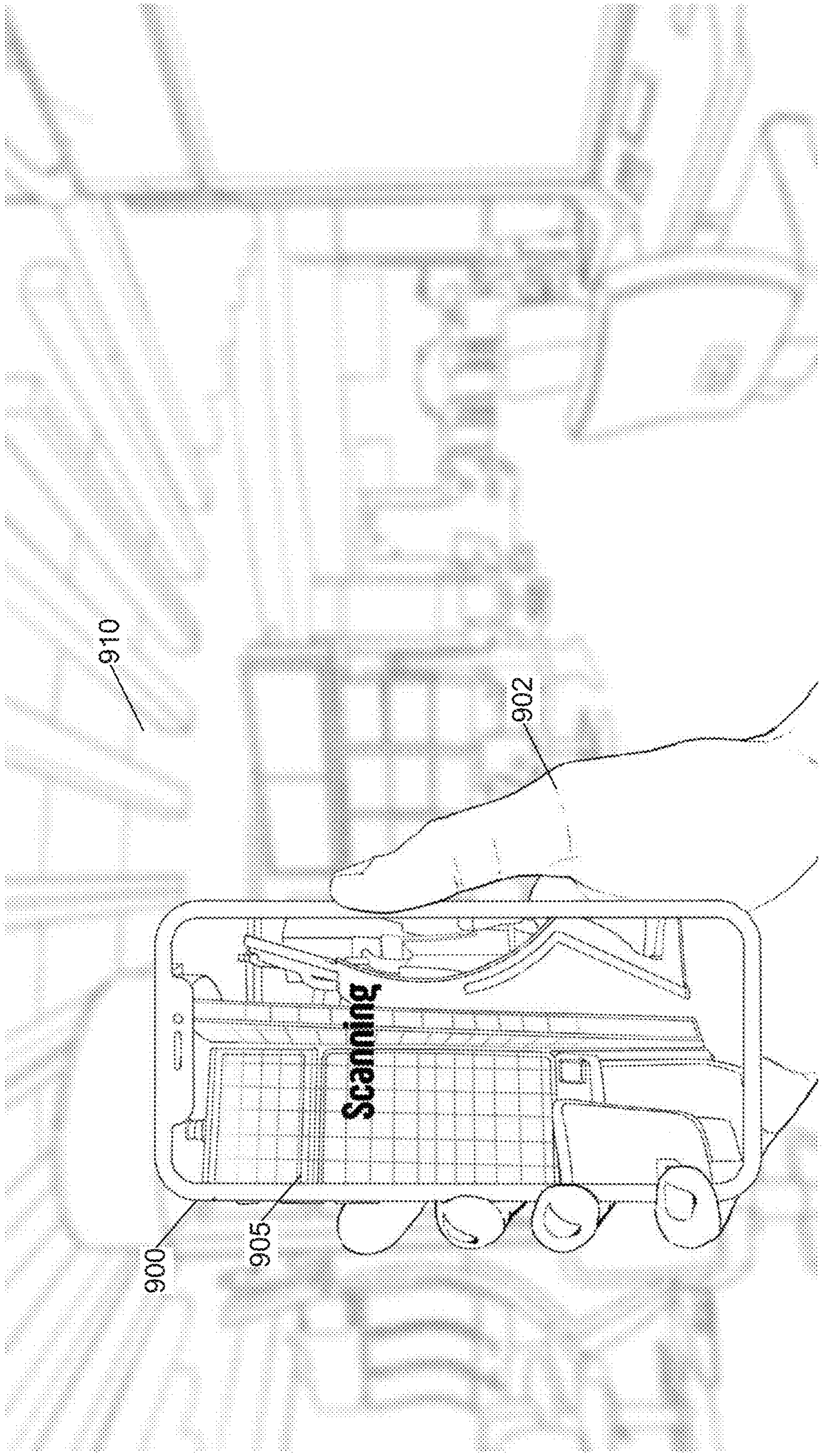
FIG. 9 depicts an example diagram of the client device performing initial localization scan in the physical gaming area, in accordance with one or more embodiments.

The flowchart 800 begins at block 805, where the client device performs a scan of the gaming area. The scan may be performed for localization purposes by detecting and recognizing features in the gaming area from which the client device can determine its location. For example, the client device can capture sensor data such as image data, depth data, or the like, to detect features within the gaming area which can be compared to a predefined map or other location data for the gaming area. In some embodiments, the augmented reality game may be initiated by determining a device location in the environment, from which the client device may determine how to present graphical content associated with the augmented reality game. For example, as shown in FIG. 9, a user 902 can use a mobile device 900 to perform a scan 905 of a physical gaming environment 910. As such, at block 810, the device determines location of the device within the physical gaming area based on the scan. Localization can be performed in any number of ways, for example based on individual localization, navigational localization, or the like. As an example, a local device may have access to a 3D representation of the physical gaming environment and may compare sensor data obtained from the scan performed at block 805 to identify a current location in the physical gaming area. The 3D representation may be in the form of a 3D model, a point cloud, a 3D mesh representation, a 3D geometric model, or the like.

The flowchart 800 continues to block 815, where one or more game paths are obtained on the local device based on the location. For example, one or more game paths may be predefined and accessible to the local device from a remote device, such as network storage, server, or other computing device communicably coupled to the client device. According to some embodiments, the one or more game paths may be made accessible based on the determined location of the client device. For example, access to game paths specific to the game area may be provided. As another example, game paths which traverse a current location of the client device within the gaming area based on the localization data may be provided, or paths which are within a predefined range of the current location of the client device. Alternatively, a remote device, such as a server or other system hosting the augmented reality game, may provide game path and minigame information based on the location. That is, obtaining one or more game paths at block 815 may comprise transmitting a request for game paths and minigame information to a host server or other network device.

Figure 10:
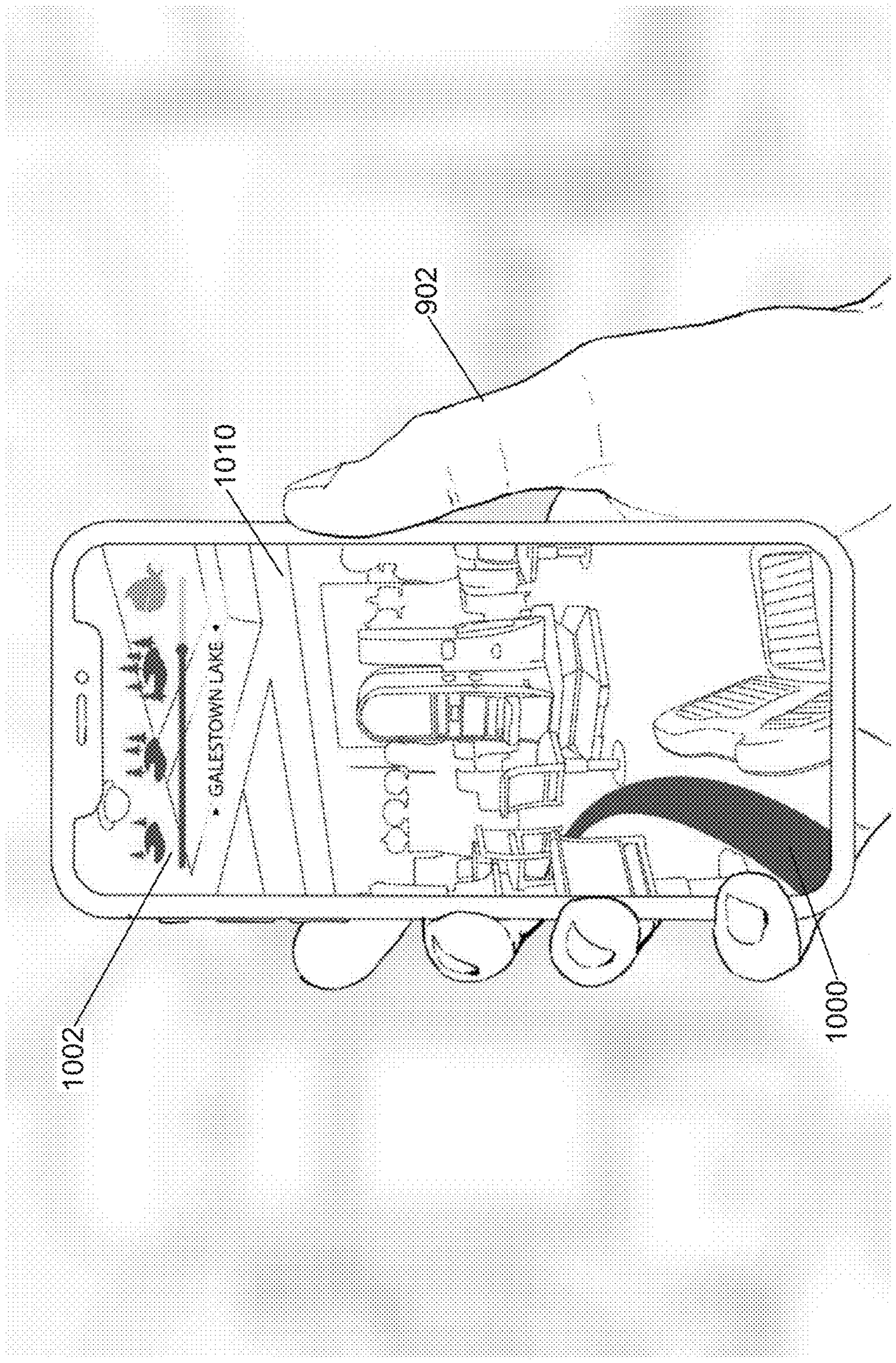
FIG. 10 depicts a client device presenting a game paths, in accordance with one or more embodiments.

The flowchart 800 continues at block 820, where a graphical indication of one of the game paths is presented on the local device. In one or more embodiments, the game path may be presented as an augmented reality overlay. That is, the local device may capture a current view of the physical environment using one or more cameras and may present the game path as a graphical presentation over the real-time view of the physical environment. For example, the local device can use a camera to capture a view of the physical environment and present that view on a display. Concurrently, the device can render the graphical representation associated with the game path and present the graphical representation on a portion of the display associated with the game path and corresponding to the physical location as presented on the display. For example, a composite image can be generated by the local device by blending the view of the gaming area with the rendered graphical representation. As shown in FIG. 10, a user 902 using the device 900 can view the physical gaming environment 1010 on the user device 900. For example, the user device 900 may be a mobile device having a display, such as a mobile phone, tablet, or other electronic device. The device 900 may have one or more cameras configured to capture images of an environment. The device 900 can then display a view of the environment on the display based on the captured images. In addition, the user device 900 can display a graphical indication of the path 1000. In some embodiments, the device 900 may present additional representations of the path for assistance in user navigation, such as, as shown at 1002, a graphical indication of a user's progress through the path can be presented concurrently with the graphical representation of the path 1000.

Figure 11:
FIG. 11 depicts a graphical representation of the game path and augmented reality context, in accordance with one or more embodiments.

As the user moves through the physical gaming environment, the device can present an updated view of the augmented reality game path. As will be described below, the game path can be illustrated using a graphical indication of the game paths. Turning to FIG. 11, the device 900 can present a graphical indication of the path 1100. In the example shown, the graphical indication is represented by a series of graphical ponds aligned along the selected path. A fish jumps from one pond to another, which can provide a graphical representation of navigational information along the path for display for a user. Further, as shown at 1102, the device 900 can include additional information for assisting the user in navigating the game path. As such, text box 1102 directs the user to follow the series of ponds that will lead you to a pond, wherein the pond is associated with a minigame.

As shown at block 825, the location of electronic device can be tracked with respect to one or more regions of interest along the game path. As described above, the game path may include one or more regions of interest which are associated with minigames. As such, the device continues to track location information to determine whether a region of interest is reached based on regions of interest within the game path. For example, the device can use vision-based localization, or other location information such as GPS or the like, to determine a relative location of the device within the gaming area. At block 830, a determination is made as to whether the device reaches a region of interest. For example, the current location of the device can be compared against the game path to determine whether the device is within a predefined distance of a region of interest for the game path. If the device has not yet reached a region of interest, then the flowchart continues to block 835, and the local device continues to track location information until region of interest is reached.

Returning to block 830, if a determination is made that the device has reached region of interest, then the flowchart continues to block 840, where the device displays a minigame associated with the current region of interest on the game path. In some embodiments, each region of interest on the game path may be associated with a same or different minigame. In some embodiments, the various regions of interest may be associated instances of the same minigame, or the like. The minigame may be presented in a manner such that the user can interact with the minigame. As such, a user can play the minigame while located at or near the associated region of interest, and may collect points or other credits or and associated user account based on the gameplay outcome.

Figure 12:
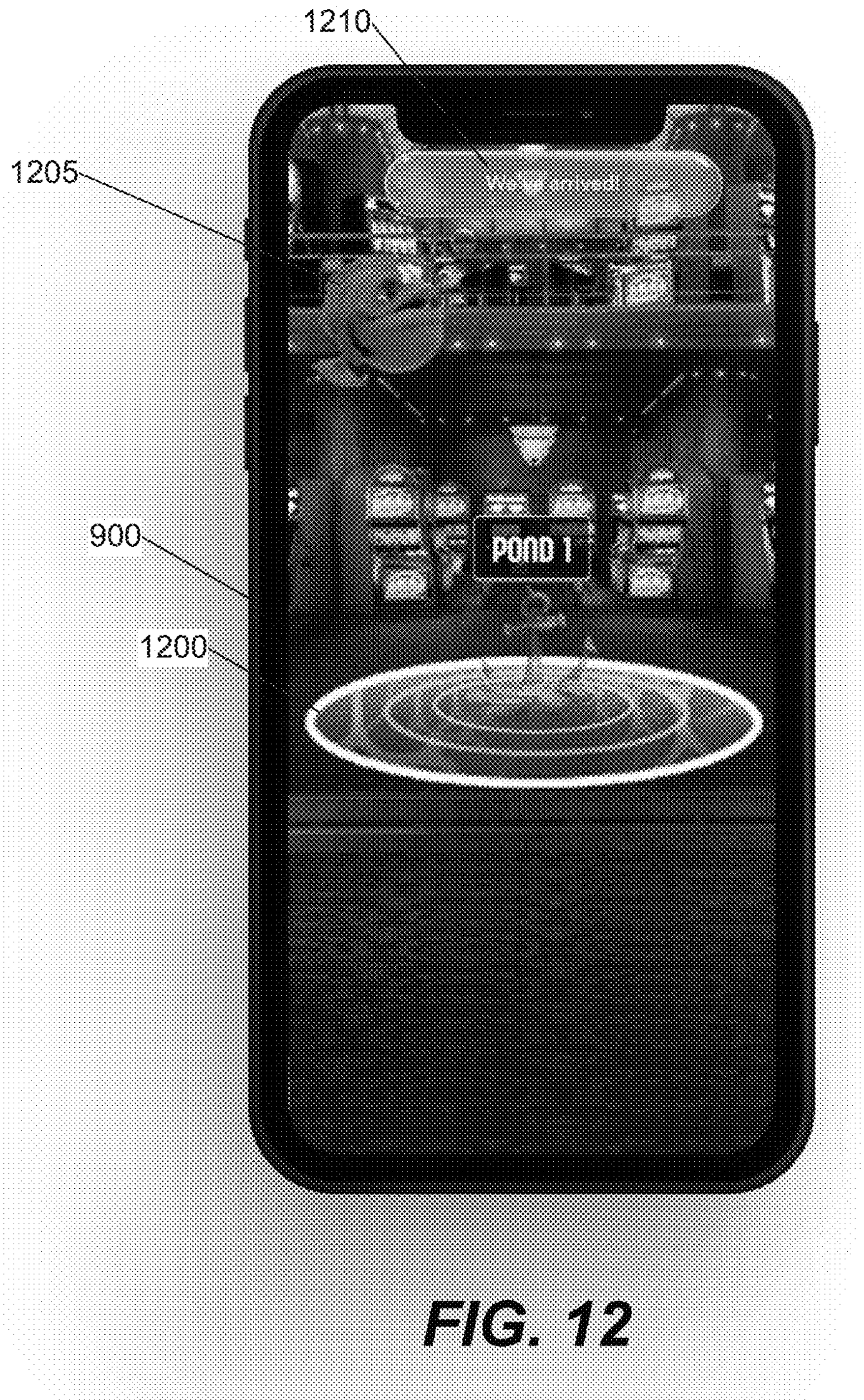
FIG. 12 depicts a graphical indication of the region of interest in the physical gaming area, in accordance with one or more embodiments.

Turning to FIG. 12, device 900 can present a text box 1210 on a display in the view of the physical gaming area which provides a notification that the user has arrived at the region of interest. In addition, a graphical indication or representation of the game may be presented. In this example, the fish 1205 jumps out of the last pond 1200 and on 1200 grows to indicate to the user that a minigame is being presented. According to some embodiments, the pond 1200 may be one of the series of ponds which navigated the user to the region of interest. Said another way, the graphical representation for the path may transition into the graphics for the game at the region of interest.

Figure 13:
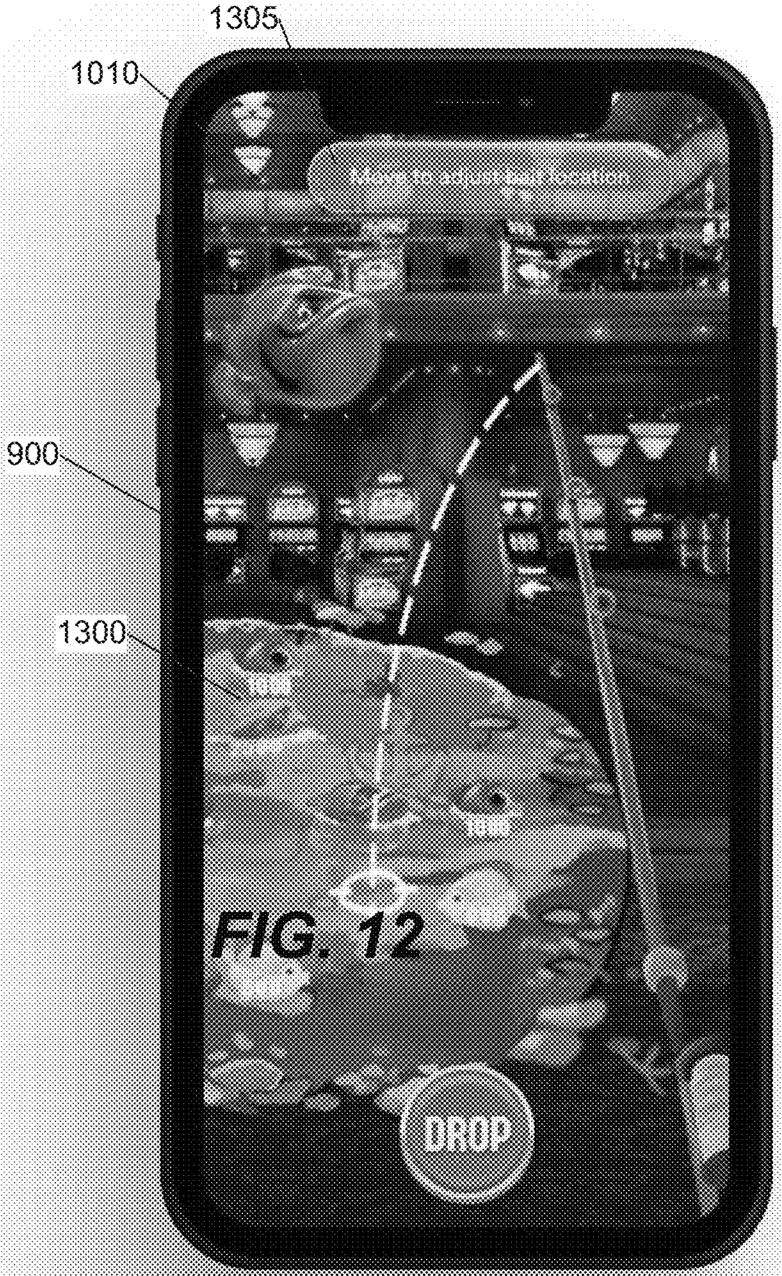
FIG. 13 depicts an example minigame presented on the client device in the client device reaches a region of interest in the physical game area, in accordance with or more embodiments.
Figure 14:
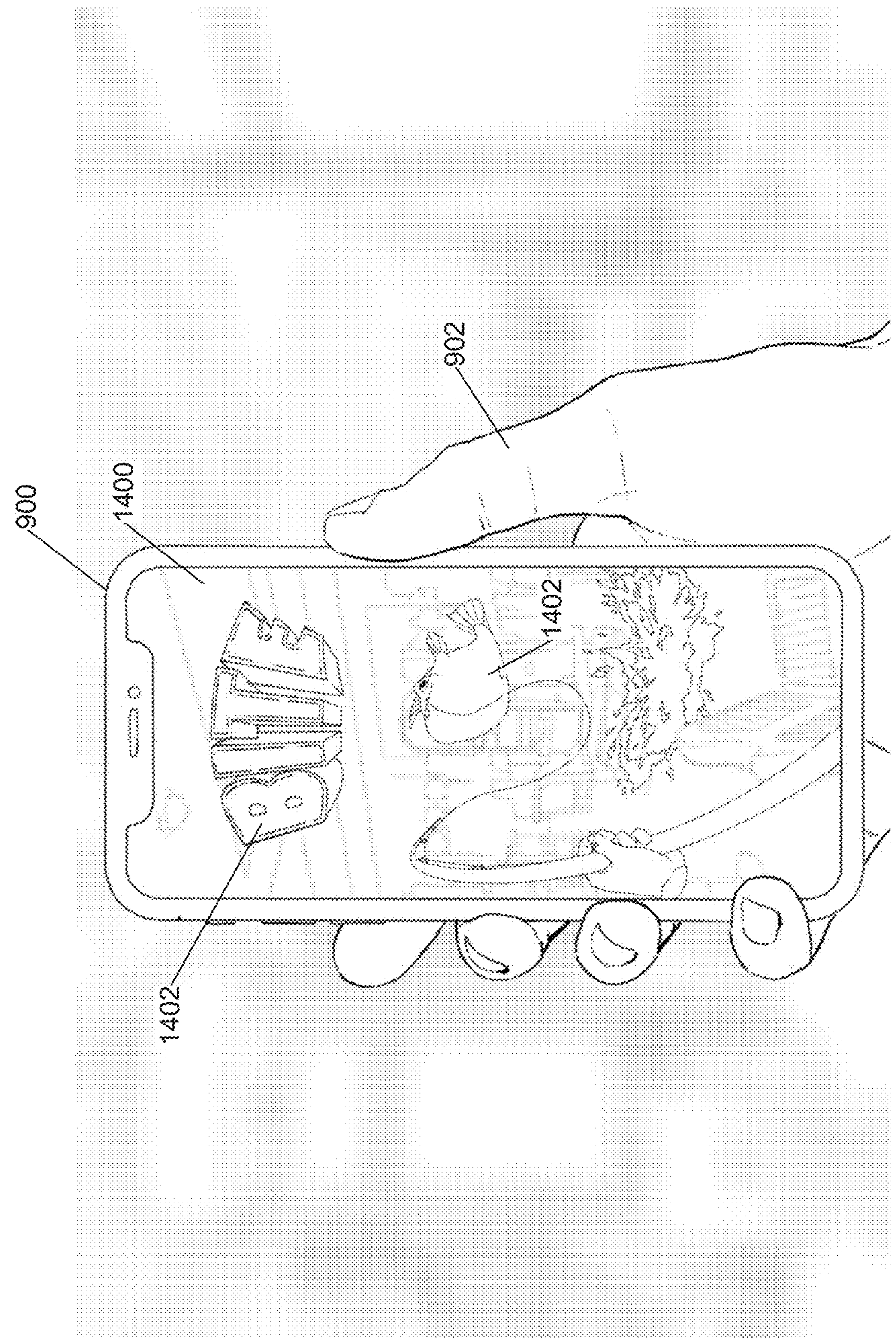
FIG. 14 depicts an example outcome of the minigame presented on the client device, in accordance with one or more embodiments.

Turning to FIG. 13, device 900 can present the minigame when the region of interest is reached. Here, the minigame is presented as a fishing game 1300, which is presented as an overlay over the view of the physical gaming environment 1010. In some embodiments, the user device 900 can additionally include instruction information 1305 that indicates how the user should play the minigame 1300. FIG. 14 presents a graphical representation 1400 on the user device indicating completion of the minigame. In this example, the user 902 has successfully caught a fish 1402 and the graphical representation includes an indication to the user at 1402 that the user has succeeded at the minigame.

Figure 15:
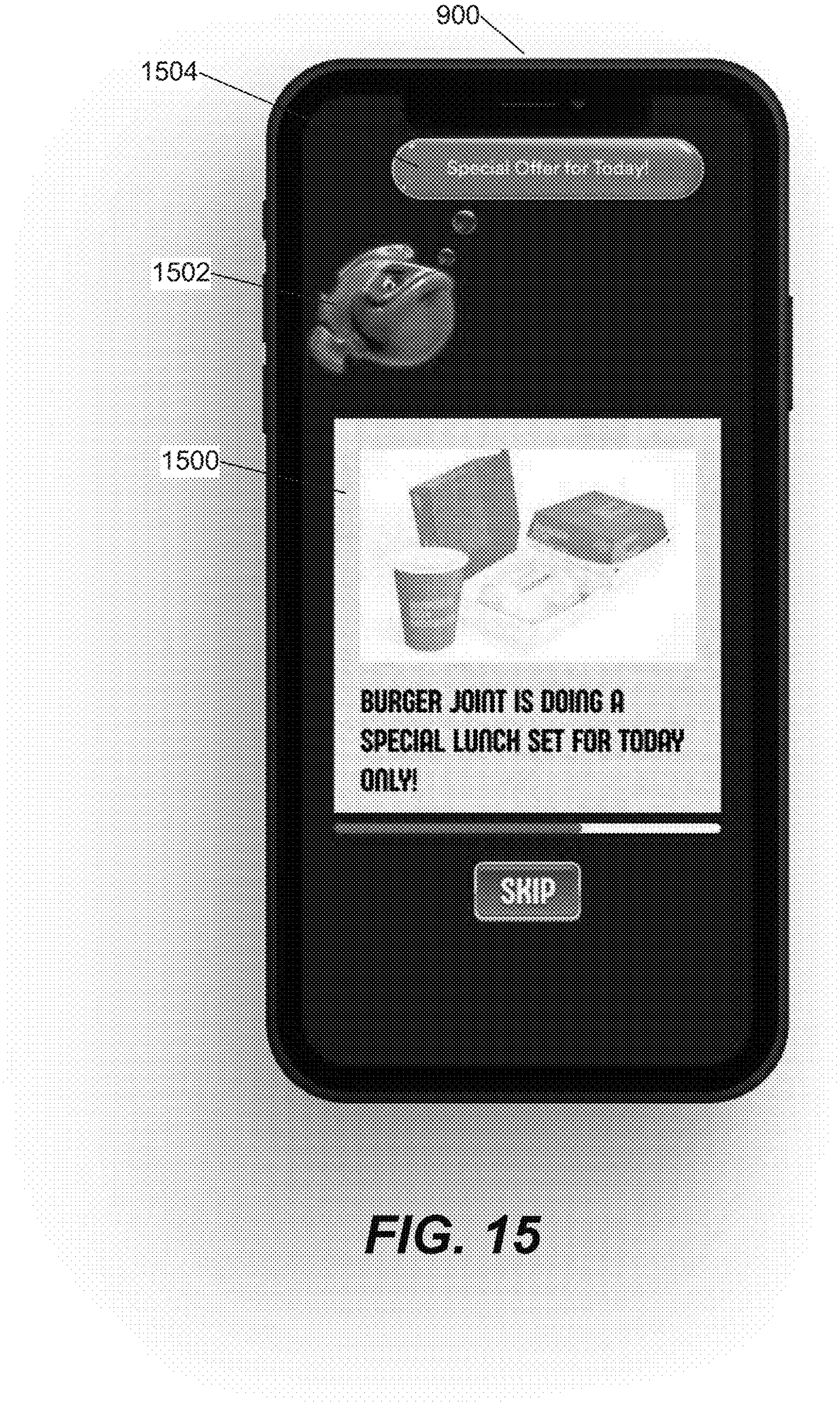
FIG. 15 depicts an example interface comprising information regarding the region of interest in the physical gaming area, and accordance as or more embodiments.

The flowchart 800 continues to block 845, information associated the current region of interest may be displayed. This information may be presented as part of the minigame, or may be presented concurrently, or before or after the minigame is presented. The information may include, for example, data regarding the physical gaming area, such as schedules, game information, product information, entertainment information, or the like. Turning to FIG. 15, the device 900 presents information 1500 related to food services provided at the region of interest. Further, the device 900 includes a graphical representation 1502 of the fish corresponding to characters in the minigame, along with a text box 1504 indicating within a same style of the minigame that the information 1500 is related to the region of interest.

At block 850, determination is made as to whether the final region of interest is reached. If the finally region of interest is reached, then the flowchart 800 proceeds to block 855, and outcome information is transmitted to a player tracking system. According to one or more embodiments, the game associated with the game path is agnostic to any particular player tracking system. Thus, in order to provide rewards to a user, the device may share the outcome information with a separate player tracking system. According to one or more embodiments, the outcome may be shared with the player tracking system, such as a CMS, by the client device, the AR system, or the like. In some embodiments, the game may obtain or otherwise have access to a player unique identifier which can be used by the CMS to provide rewards or other credits to a particular user. The flowchart then concludes.

Figure 16:
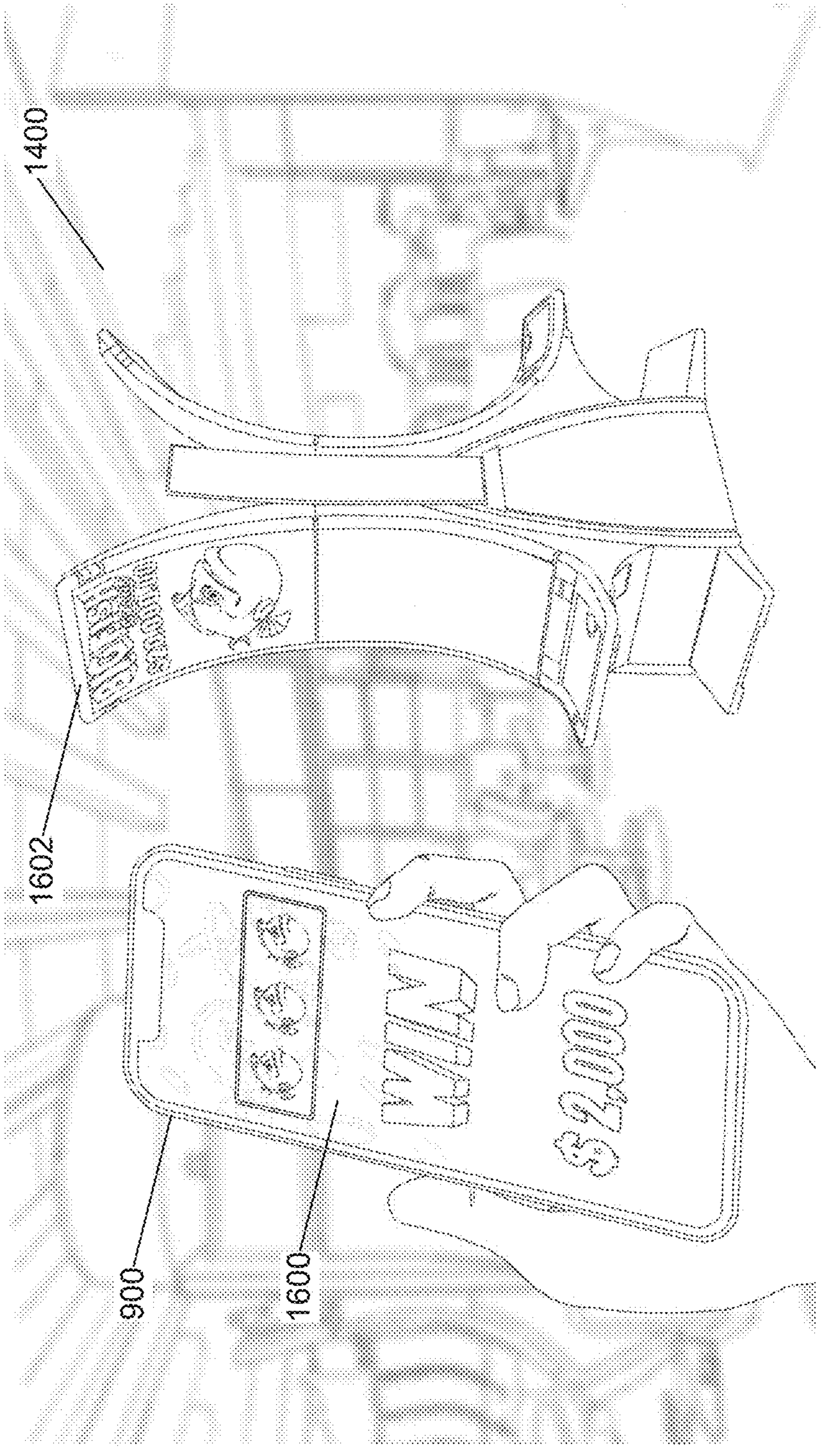
FIG. 16 depicts an example diagram of a client device reaching a final region of interest along game pass, and according to the more embodiments.

Returning to block 850, if the final region of interest is not reached, then the flowchart returned to block 835 and the device continues to track current location as the local device navigates through the game path until the game path is concluded. Turning to FIG. 16, the device 900 can present an indication 1600 that the game path is complete. In some embodiments, the game path can conclude that a region of interest that corresponds to the minigame. For example, here the many game included a fishing game, and the game path has concluded at a physical electronic gaming machine 1602 that corresponds to the fishing game. As such, when the user reaches the physical electronic gaming machine 1602, the user may already be familiar with characteristics of the physical electronic and machine 1602, such as game characters, game graphics, game mechanics, and the like.

Figure 17:
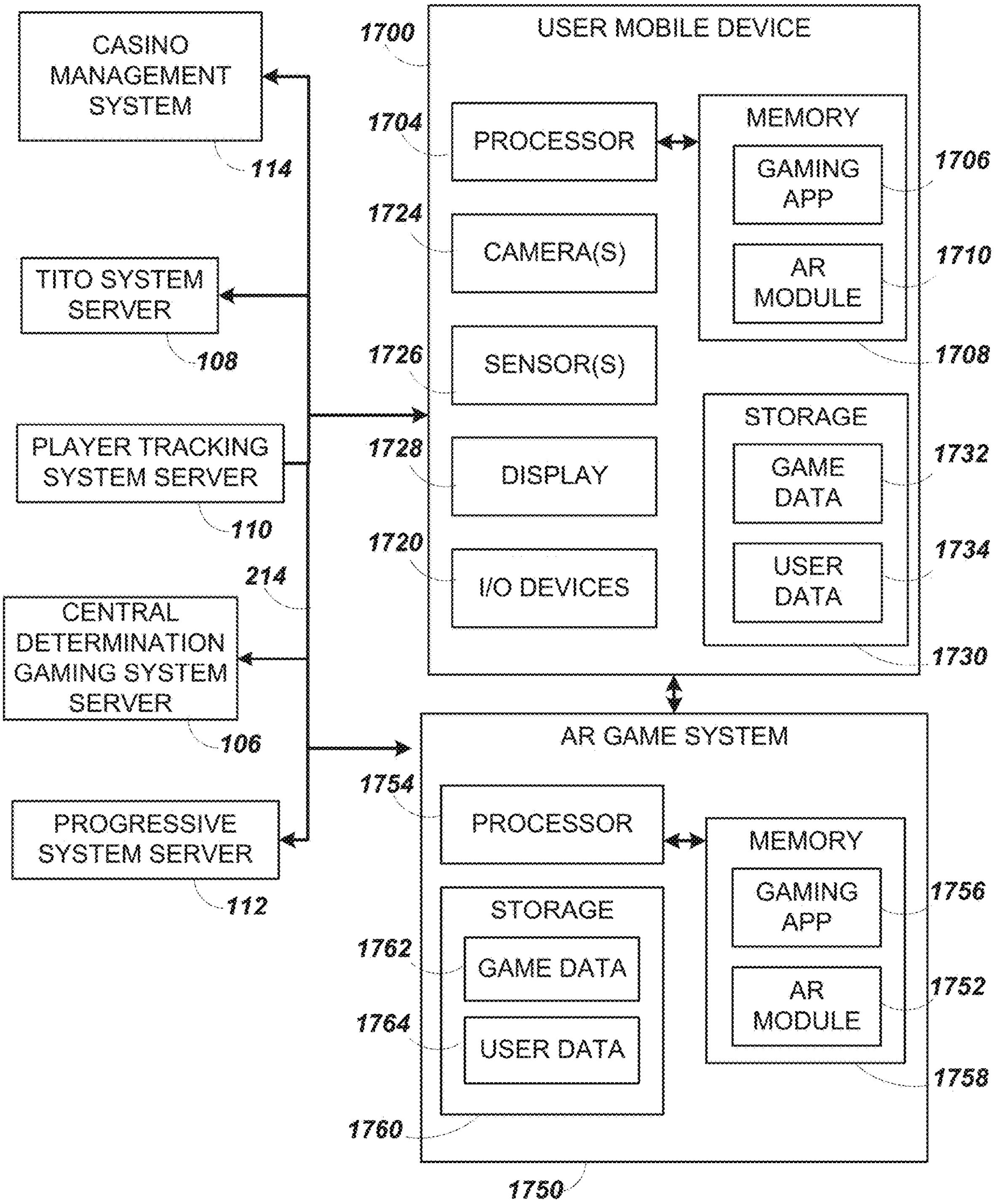
FIG. 17 depicts a system diagram for a client device configurable to navigate and interact with the game path and many games, in accordance with a more embodiments.

FIG. 17 depicts a system diagram for a client device configurable to navigate and interact with the game path and many games, in accordance with a more embodiments.

User mobile device 1700 includes one or more processors 1704. Processor 1704 represents a general-purpose processor, a specialized processor intended to perform certain functional tasks, or a combination thereof. As an example, processor 1704 can be a central processing unit (CPU) that has one or more multi-core processing units and memory mediums (e.g., cache memory) that function as buffers and/or temporary storage for data. Alternatively, processor 1704 can be a specialized processor, such as an application specific integrated circuit (ASIC), graphics processing unit (GPU), field-programmable gate array (FPGA), digital signal processor (DSP), or another type of hardware accelerator. In another example, processor 1704 is a system on chip (SoC) that combines and integrates one or more general-purpose processors and/or one or more specialized processors. Although FIG. 17 illustrates that user mobile device 1700 includes a single processor 1704, user mobile device 1700 is not limited to this representation and instead can include multiple processors 1704 (e.g., two or more processors).

FIG. 17 illustrates that processor 1704 is operatively coupled to memory 1708. Memory 1708 is defined herein as including volatile and nonvolatile memory and other types of non-transitory data storage components. Volatile memory is memory that do not retain data values upon loss of power. Nonvolatile memory is memory that do retain data upon a loss of power. Examples of memory 1708 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 17 illustrates that user mobile device 1700 includes a single memory 1708, user mobile device 1700 could include multiple memories 1708 for storing program instructions and/or data.

Memory 1708 can store one or more game programs 1706 that provide program instructions and/or data for carrying out various implementations (e.g., game mechanics) described herein. Stated another way, game program 1706 represents an executable program stored in any portion or component of memory 1708. In one or more implementations, game program 1706 is embodied in the form of source code that includes human-readable statements written in a programming language or machine code that contains numerical instructions recognizable by a suitable execution system, such as a processor 1704 in a game controller or other system. Examples of executable programs include: (1) a compiled program that can be translated into machine code in a format that can be loaded into a random access portion of memory 1708 and run by processor 1704; (2) source code that may be expressed in proper format such as object code that is capable of being loaded into a random access portion of memory 1708 and executed by processor 1704; and (3) source code that may be interpreted by another executable program to generate instructions in a random access portion of memory 1708 to be executed by processor 1704.

Alternatively, game programs 1706 can be set up to generate one or more game instances based on instructions and/or data that user mobile device 1700 exchanges with one or more remote devices, such as a central determination gaming system server 106. For purpose of this disclosure, the term "game instance" refers to a play or a round of a game that user mobile device 1700 presents (e.g., via a user interface (UI)) to a player. When a game is stored on user mobile device 1700, it may be loaded from memory 1708 (e.g., from a read only memory (ROM)) or from the central determination gaming system server 106 to memory 1708.

FIG. 17 also depicts that user mobile device 1700 is connected over a network to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program.

In one or more embodiments, user mobile device 1700 may include an AR module 1710 which may support the user mobile device 1700 to present an augmented reality game from the gaming app 1706. The AR module 1710 may be configured to use camera data from camera(s) 1722 and/or other sensors 1724 (such as location sensors, gyroscopic sensors, and the like), to generate virtual content for presentation on a display 1726. In one or more embodiments, gaming app 1706 and AR module 1710 may additionally user other locally stored data from storage 1730. Storage 1730 may include, for example hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other storage devices. The storage 1730 may be configured to store game data 1732 and user data 1734, such as user account information, which may be used to support execution of the gaming app 1706 and/or the AR module 1710.

FIG. 17 additionally depicts that AR game system 1750 is connected over a network to player tracking system server 110. The AR game system 1750 may include functionality for performing processes related to AR and/or an associated game. In some embodiments, the AR game system 1750 may include one or more servers or other computing devices which can be used to offload processes off of the user mobile device 1700 to improve compute and conserve resources. As such, the AR game system may include an AR module 1752 configured to use sensor data, for example captured by user mobile device 1700, to generate virtual content. The AR game system 1750 may additionally host gaming app 1756 which may be provided to the user mobile device 1700. Storage 1760 may include, for example hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other storage devices. The storage 1760 may be configured to store game data 1762 and user data 1764, such as user account information, player identifiers, or the like, which may be used to support execution of the gaming app 1756 and/or the AR module 1752. The AR game system 1750 may additionally include one or more processors 1754, which can be configured to process the instructions stored in memory 1758. According to one or more embodiments, the various components and functionality described within the AR game system 1750 may be differently distributed. For example, the various components and functionality may be alternatively located or performed by the casino management system 114, user mobile device 1700, or the like.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system comprising:

one or more processors;

one or more computer readable media comprising computer readable code executable by the one or more processors to:

capture, by one or more sensors of a local device, sensor data of a physical gaming area;

generate, by the local device, an environment map comprising a geometric representation of the physical gaming area based on the sensor data;

identify a game path through the physical gaming area from a current location of the local device, wherein the game path is identified from a traversable region of the physical gaming area as determined from the environment map, wherein the game path is identified based on the game path comprising a threshold number of regions of interest identified from the environment map;

present the identified game path as a graphical navigation overlay on the local device, wherein the graphical navigation overlay depicts a traversable path through a view of the physical gaming area;

track a location of the local device using sensor data captured by the local device;

determine, based on the tracked location of the local device and the environment map, that the local device has reached a first region of interest within the physical gaming area; and in accordance with the determination that the local device has reached the first region of interest, initiate a minigame associated with the first region of interest, on the local device, wherein the minigame is presented as a minigame overlay on the local device over a view of the first region of interest of the physical gaming area, wherein an outcome of the minigame is provided to a player tracking system.

2. The system of claim 1, wherein the game path concludes at a region of interest in the physical gaming area having a physical electronic game cabinet that coordinates with the minigame overlay.

3. The system of claim 1, wherein the computer readable code to capture the sensor data comprises computer readable code to:

present a graphical overlay appearing on one or more physical surfaces in the physical gaming area indicating that the sensor data is being captured.

4. The system of claim 1, wherein the computer readable code to identify the game path further comprises computer readable code to:

select the game path from among a plurality of potential game paths.

5. The system of claim 4, wherein the game path is selected at random.

6. The system of claim 4, wherein the game path is selected based on a characteristic of a user of the local device.

7. The system of claim 6, wherein the computer readable code to track the location of the local device further comprises computer readable code to:

present an animated graphic on the local device to navigate the user along the game path as the local device moves through the physical gaming area along the game path.

8. A non-transitory computer readable medium comprising computer readable code executable by one or more processors to:

capture, by one or more sensors of a local device, sensor data of a physical gaming area;

generate, by the local device, an environment map comprising a geometric representation of the physical gaming area based on the sensor data;

identify a game path through the physical gaming area from a current location of the local device, wherein the game path is identified from a traversable region of the physical gaming area as determined from the environment map, wherein the game path is identified based on the game path comprising a threshold number of regions of interest identified from the environment map;

generate a graphical navigation overlay comprising the identified game path as a traversable path through a view of the physical gaming area;

providing a playable minigame overlay associated with a first region of interest, wherein the first region of interest is detected based on a tracked location of the local device and the environment map, and wherein the playable minigame overlay is presented over a view of the first region of interest of the physical gaming area; and transmit an outcome of the playable minigame overlay and a player identifier to a player tracking system.

9. The non-transitory computer readable medium of claim 8, wherein the game path concludes at a region of interest in the physical gaming area having a physical electronic game cabinet that coordinates with the minigame overlay.

10. The non-transitory computer readable medium of claim 8, further comprising computer readable code to:

cause a user mobile device to perform a scan of the physical gaming area.

11. The non-transitory computer readable medium of claim 8, wherein the computer readable code to identify the game path further comprises computer readable code to:

select the game path from among a plurality of potential game paths.

12. The non-transitory computer readable medium of claim 11, wherein the game path is selected at random.

13. The non-transitory computer readable medium of claim 11, wherein the game path is selected based on a characteristic of a user.

14. The non-transitory computer readable medium of claim 13, wherein the computer readable code to track the location of the local device further comprises computer readable code to:

provide an animated graphic to a user mobile device to navigate the user along the game path.

15. A method comprising:

capturing, by one or more sensors of a local device, sensor data of a physical gaming area;

generating, by the local device, an environment map comprising a geometric representation of the physical gaming area based on the sensor data;

identifying a game path through the physical gaming area from a current location of the local device, wherein the game path is identified from a traversable region of the physical gaming area as determined from the environment map, wherein the game path is identified based on the game path comprising a threshold number of regions of interest identified from the environment map;

presenting the identified game path as a graphical navigation overlay on the local device, wherein the graphical navigation overlay depicts a traversable path through a view of the physical gaming area;

tracking a location of the local device using sensor data captured by the local device;

determining, based on the tracked location of the local device and the environment map that the local device has reached a first region of interest within the physical gaming area; and in accordance with the determination that the local device has reached the first region of interest, initiate a minigame associated with the first region of interest on the local device, wherein the minigame is presented as a minigame overlay on the local device over a view of the first region of interest of the physical gaming area.

16. The method of claim 15, wherein the game path concludes at a region of interest in the physical gaming area having a physical electronic game cabinet that coordinates with the minigame overlay.

17. The method of claim 15, wherein the computer readable code to capture the sensor data comprises computer readable code to:

presenting a graphical overlay appearing on one or more physical surfaces in the physical gaming area indicating that the sensor data is being captured.

18. The method of claim 15, wherein identifying the game path further comprises:

selecting the game path from among a plurality of potential game paths.

19. The method of claim 18, wherein the game path is selected based on a characteristic of a user of the local device.

20. The method of claim 19, wherein tracking the location of the local device further comprises:

presenting an animated graphic on the local device to navigate the user along the game path as the local device moves through the physical gaming area along the game path.

* * * * *